Figure 4:
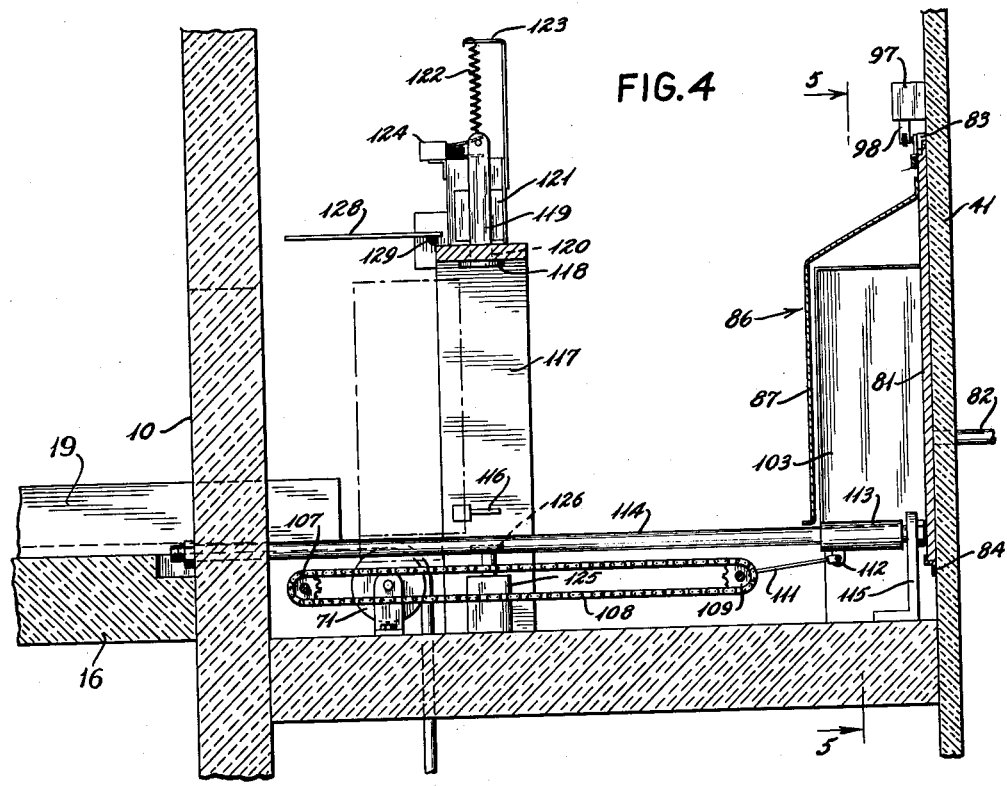

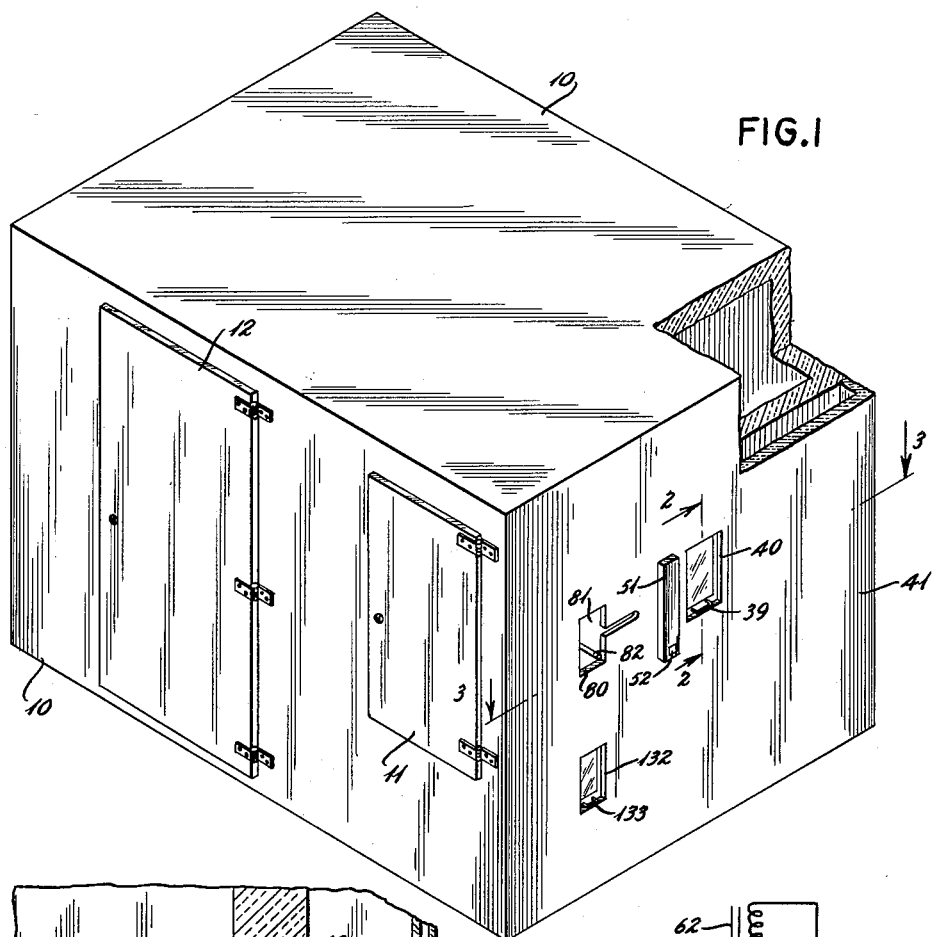
June 19, 1962 G. B. MENEFEE 3,039,583
REFRIGERATION AND DISPENSING OF CONTAINERS OF MATTER
AND ISSUING A REFUND FOR EMPTY CONTAINERS
Filed Nov. 2, 1959 5 Sheets-Sheet 1
INVENTOR
G.B. MENEFEE
BY
ATTORNEY

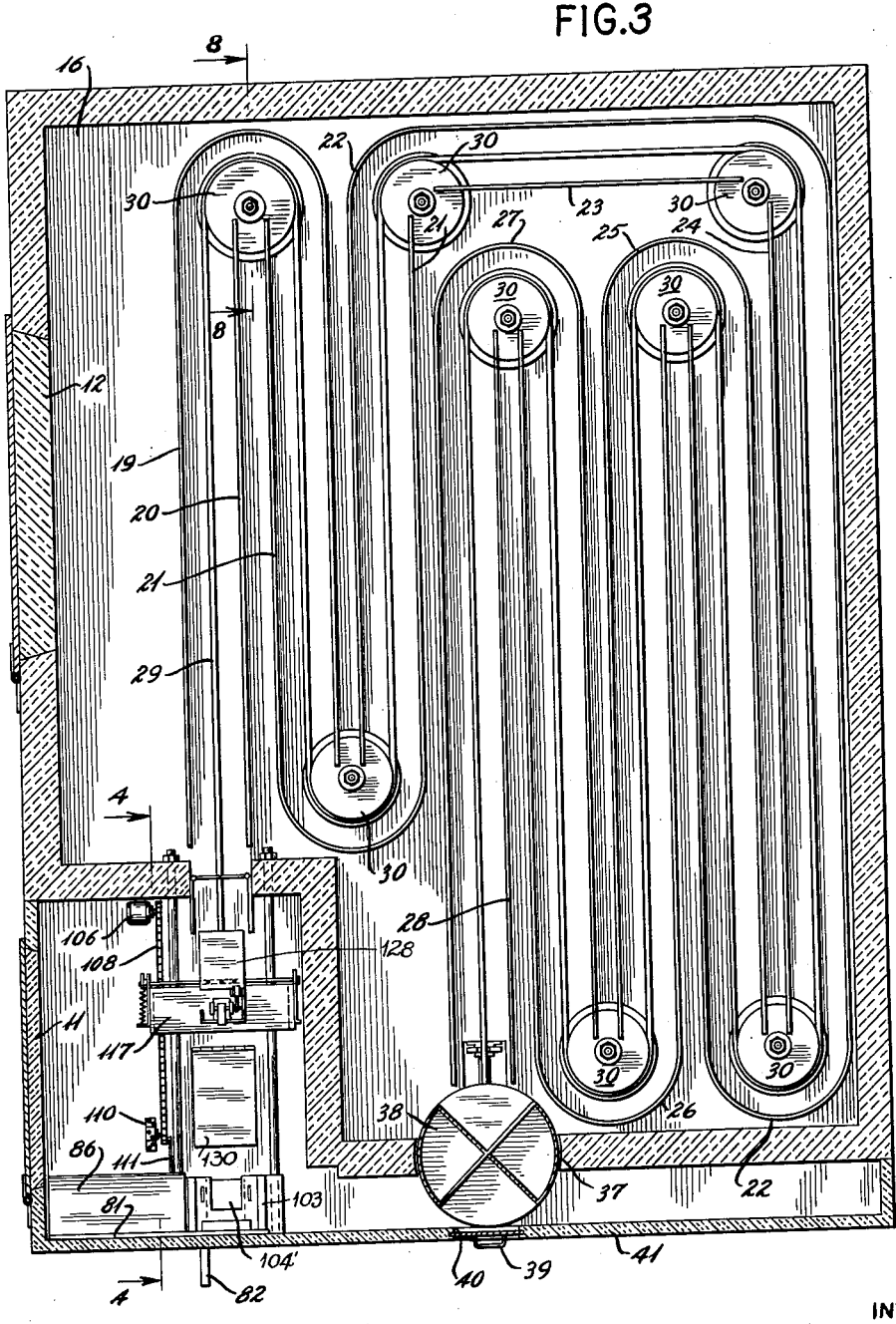

INVENTOR
G. B. MENEFEE

June 19, 1962 G. B. MENEFEE 3,039,583
REFRIGERATION AND DISPENSING OF CONTAINERS OF MATTER
AND ISSUING A REFUND FOR EMPTY CONTAINERS
Filed Nov. 2, 1959 5 Sheets-Sheet 4

INVENTOR
G.B. MENEFEE

BY *[signature]*
ATTORNEY

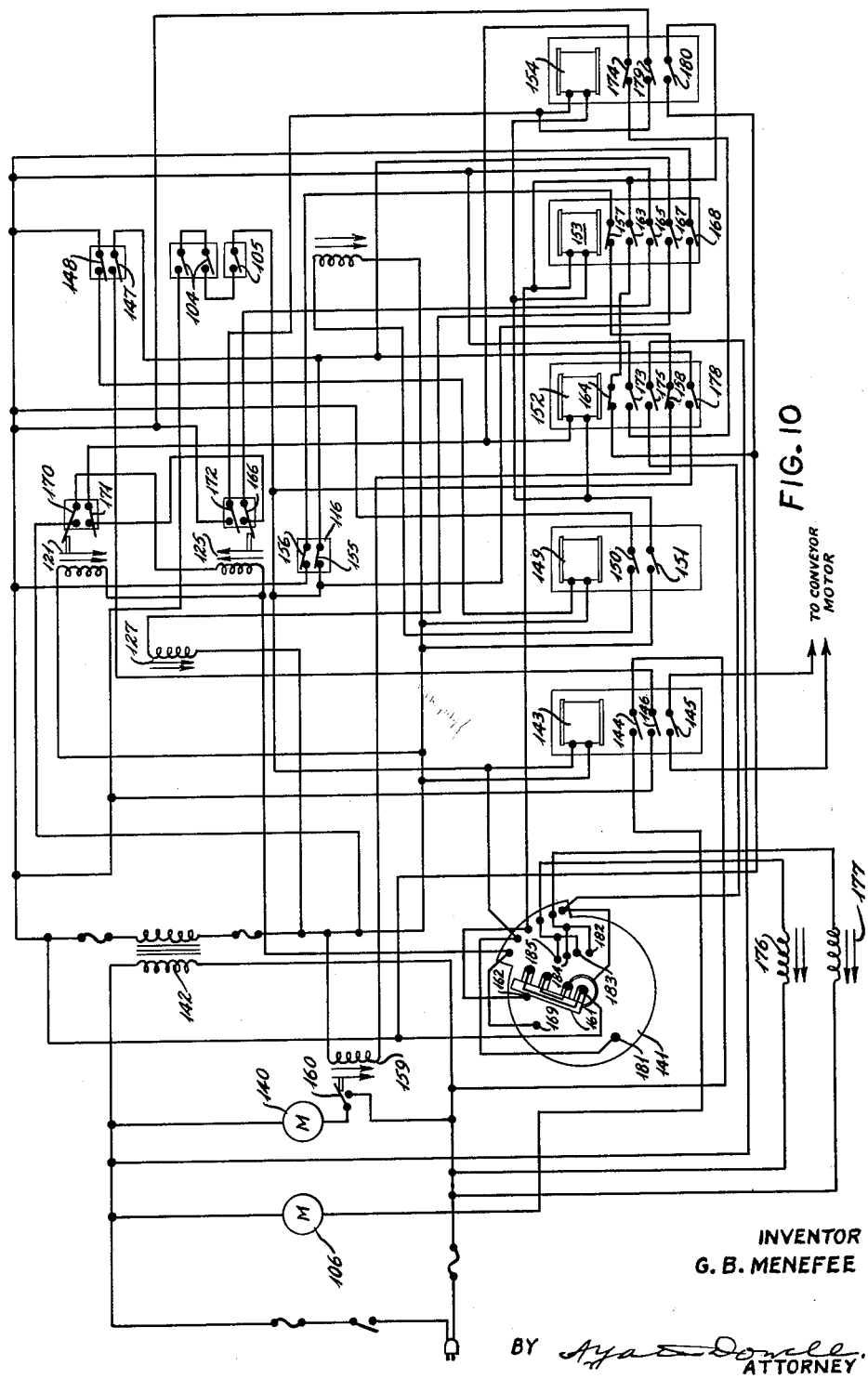

United States Patent Office 3,039,583
Patented June 19, 1962

1

3,039,583
REFRIGERATION AND DISPENSING OF CONTAINERS OF MATTER AND ISSUING A REFUND FOR EMPTY CONTAINERS
Granger B. Menefee, 4433 Alan Drive, Baltimore, Md.
Filed Nov. 2, 1959, Ser. No. 850,288
9 Claims. (Cl. 194—4)

This invention relates to foods, the care, handling, preservation, and dispensing of the same, and to the equipment employed in the production of such foods and the handling including the supply of the same to the consumer.

The invention relates particularly to the distribution and sale of products of various kinds, both liquids and solids, and including milk and other substances contained in holders or receptacles of various kinds, shapes, and sizes, and to the refrigeration thereof to retain the freshness or original condition of the product as long as possible.

Certain products including milk have been delivered in bottles of glass, and in other containers such as cardboard cartons and the like, and in the present highly competitive era the delivery in glass bottles is preferable and less expensive if there is no loss of bottles since cartons or containers of cardboard or other composition of half gallon size cost approximately four cents each and are useable only once whereas glass bottles cost approximately twenty cents each and can be used repeatedly. The custody of the returnable bottle therefor is an important factor in the distribution and sale of milk.

It is an object of the invention to provide a coin controlled dispenser for milk in bottles, to provide means for maintaining the milk to be dispensed under refrigeration and to provide means for automatically issuing a refund for the cost of each of the bottles when the bottles are returned carrying the proper identification.

Another object of the invention is to provide a refrigerated area for commodities to be dispensed, coil controlled means for dispensing such articles, automatic means for issuing a refund for each of empty containers returned, and a single conveyor for both the containers dispensed and the empties returned, as well as electronic means for the operational control thereof and for sensing the presence or absence of the desired conditions so that unauthorized operations of the machine will be prevented.

A further object of the invention is to provide apparatus of the character indicated in which the container dispensed is provided with identification or key means so that when the empty is returned it will not be accepted but would be rejected if the container does not carry the proper key.

Figure 5:
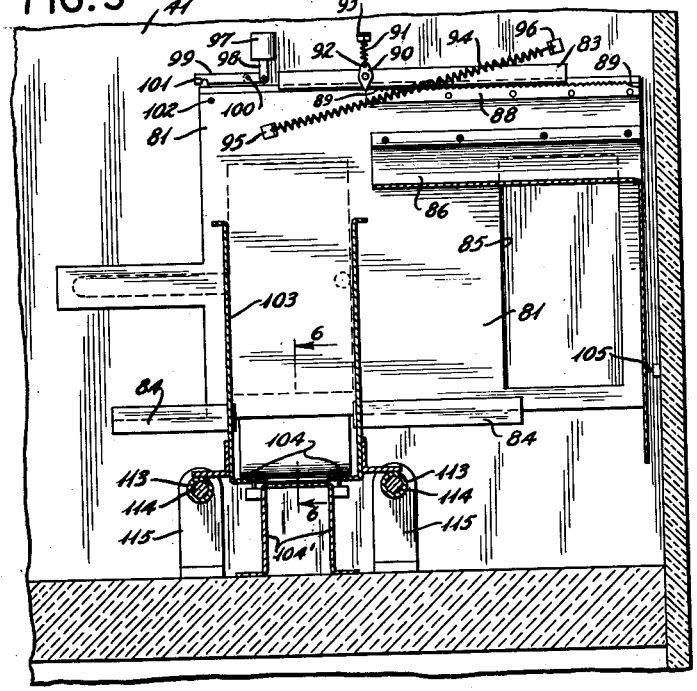
Figure 6:
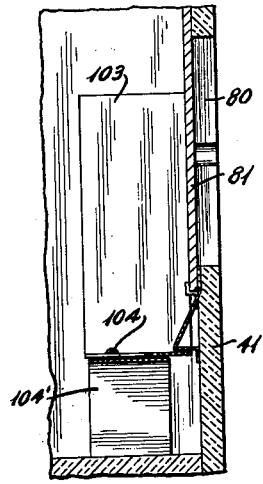
Figure 7:
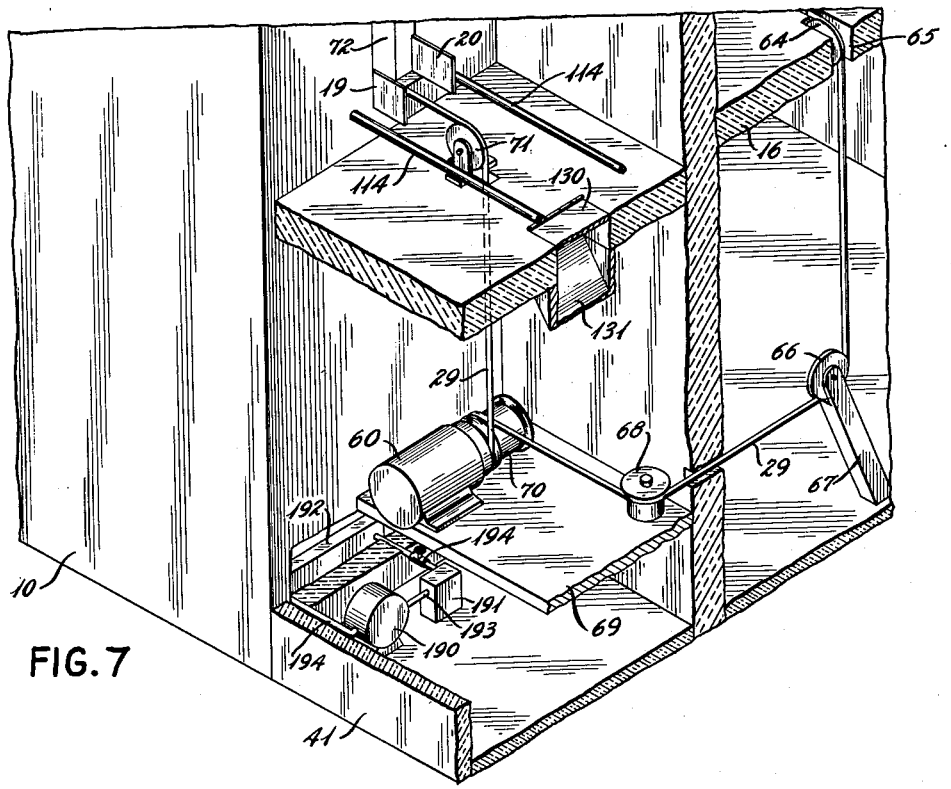
Figure 8:
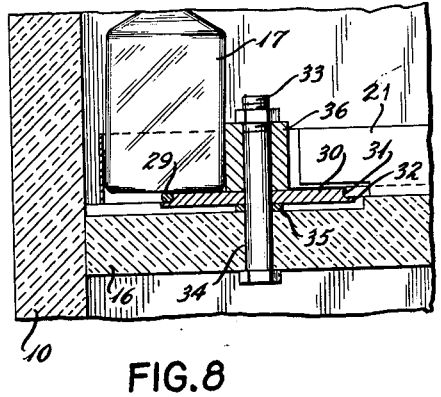
Figure 9:
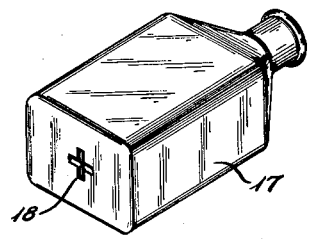

Other objects and advantages of the invention will be apparent from the following description taken in conjunction with the accompanying drawings wherein:

FIG. 1 is a perspective of a coin-operated bottled milk dispenser with means for issuing a refund for each empty bottle returned;

FIG. 2, a vertical section on the line 2—2 of FIG. 1;
FIG. 3, a horizontal section on the line 3—3 of FIG. 1;
FIG. 4, a vertical section on the line 4—4 of FIG. 3;
FIG. 5, a vertical section on the line 5—5 of FIG. 4;
FIG. 6, a vertical section on the line 6—6 of FIG. 5;
FIG. 7, a fragmentary perspective of the conveyor driving mechanism;
FIG. 8, a section on the line 8—8 of FIG. 3;
FIG. 9, a perspective of a milk bottle with the identification key;
FIG. 10, a schematic view of the bottle return wiring diagram; and
FIG. 11, a schematic view of the bottled milk dispenser wiring diagram.

2

Briefly stated the invention is an apparatus for retaining material such as milk in containers substantially at a constant temperature, and coin-operated means for dispensing such material as well as for issuing a refund upon the return of empty containers in which the material was held. A cabinet is provided having insulated walls to prevent the passage of heat therethrough and a temperature modifying system is provided having an element withing the cabinet for heating or cooling. A floor or support is provided for the material with guides defining a serpentine path and with a cable conveyor flat on the floor along such path so that when the containers of milk or other material are placed between the guides on the cable they will be carried along until they meet with an obstacle and are prevented from further movement while the cable may continue to move beneath such containers. The cabinet is provided with suitable access doors for placing full containers on and removing empty containers from the conveyor as well as for the servicing of the electrical equipment by which the conveyor and the dispensing and coin returning functions are operated.

With continued reference to the drawings, a cabinet 10 has walls insulated to retard the passage of heat therethrough. A door 11 allows for the servicing of the bottle return mechanism and a service door 12 is provided through which bottles of milk may be supplied and empty milk bottles removed.

While the invention is illustrated and described in connection with milk bottles, it is to be understood that this is by way of illustration and not limitation as the device is intended for use with other commodities desired to be dispensed and particularly where it is desired to have mechanism to accept an article returned and to issue a refund therefor.

In order to modify the temperature within the cabinet, suitable conventional temperature modification means may be provided such as a refrigeration system including a coil 13 (FIG. 3) which may form part of a conventional system for heating and cooling. Where cooling is desired, liquid refrigerant may be supplied from a condenser 14 receiving compressed vaporous refrigerant from a compressor 15 and with a suction or return line 16 from the coil 13 through which the expanded or gaseous refrigerant is returned to the compressor 15 for recompression.

If desired the refrigeration system could be a dual system which by operation in the reverse direction supplies heat to the coil 13. It will be understood of course that the capacity of the temperature modification system will be proportionate to the size of the space the temperature of which is to be modified.

Within the cabinet 10 is located a floor 16 on which bottles 17 are placed in upright position centrally between parallel guides 19–28, inclusive, each bottle having an identification key recess 18 in its bottom. Lying on the floor is an endless conveyor cable 29 on which the bottles are placed and by means of which the bottles are moved lengthwise between the guides until the circuitous or serpentine space between the guides is filled substantially with only enough space left to accommodate a desired number of empty bottles as they are returned.

The endless conveyor cable 29, resting on the floor 16, extends around a series of pulleys 30 each having a peripheral groove 21 with an underlying flange 32 in which the cable 29 is received. Each pulley 30 is pivotally mounted on an upright bolt and nut 33 located in an opening 34 in the floor 16. The pulleys 30 may be mounted on thrust bearings 35 and each pulley has an upstanding hub 36 which assists in guiding the milk bottles in their travel propelled by the cable 29 on which they rest until the filled bottles are dispensed or empty bottles removed through the service door 12.

The cabinet 10 is provided with an opening 37 and a revolving door 38 for the discharge of bottles of milk, and a slideable panel 39 is provided to afford access to the revolving door 38 to permit removal of a bottle of milk through an opening 40 in a facade or false front 41 which encloses the empty bottle return mechanism. The door 38 is provided with upper and lower pivots or bearing posts 42 and 43 mounted in bearings 44 in upper and lower recesses 45 and 46 in the wall of the cabinet 10, the rotation of the door being by means of a motor 47 through sprockets 48 and 49 and a chain 50.

The operation of the mechanism is electrically by means of an electrical circuit. Coins, for example in the amount of 60 cents, are adapted to be inserted in a coin slot 51 and a coin return 52 is provided for the return of unacceptable coins when there is a supply of milk and acceptable coins when the supply of bottles of milk is exhausted. The coin return 52 also serves for the coins returned for empty bottles. Coins inserted in the coin slot 51 operate an electric switch 53 which closes the circuit to energize a solenoid 54 which closes a switch 55 to energize a motor through a conductor 56 energizing a motor 57. The motor turns a drum switch 58 to a switch 59 to energize a conveyor motor 60, a switch 61 to energize the bottle stop solenoid 62, a switch 63 which operates the door motor 47 and a lock switch 64 which keeps the drum motor 57 rotating after the switch 55 has been de-energized. In other words, when coins are deposited in the slot 51, they close the switch 53 energizing the solenoid 54 which closes the switch 55 and operates the conveyor motor 57 causing the conveyor to carry the bottles along the prescribed path releasing the bottle stop solenoid to permit the bottles to be moved by the conveyor, then the bottle stop will return and stop the bottles while the conveyor is still moving.

The conveyor delivers one bottle to the revolving door 38 and the door motor rotates the door to make the bottle accessible through the opening 40 upon the sliding of the panel 39. The bottles rest by gravity on the conveyor cable and by the frictional engagement with the conveyor cable they are carried along. The conveyor cable 29 passes from the floor on which it is supported downwardly over a pulley 64 through an opening 65 in the floor 16 and then about a pulley 66 mounted on a bracket 67 from which it extends around pulley 68 mounted on a shelf 69 on which is mounted a conveyor motor 60. The rotary portion of the motor has a drum 70 fixed to it by means of which one or more coils of the cable is engaged to be driven therefrom. Such cable extends upwardly over a pulley 71 from which it passes between the guides 19 and 20 on the floor 16, the cable extending through flexible doors 72 which move or flex apart only sufficiently to permit empty bottles to pass therethrough and with such doors reducing the volume of hot air entering and replacing cold air within the cabinet 10.

In order that the conveyor cable 29 may move lengthwise or slide under the bottles without a bottle of milk being dispensed, a bottle stop 62 in the form of a solenoid with a pair of tapered extensions 73 mounted on top of the core thereof in a manner to be inserted between two adjacent bottles of milk is provided. As long as the solenoid is energized the extension 73 will be in projected position and will prevent the milk bottle from advancing. When the drum switch 58 supplies energy to the bottle stop 62, the extension 73 will be retracted below the level of the bottles so that the bottles may be advanced. After one bottle has passed over the bottle stop 62 such stop will be de-energized and the extension 73 thereon will be elevated and stop the succeeding bottles while allowing the cable to deliver the first bottle to the revolving door 38 through which the bottles are dispensed.

When a bottle of milk from the machine is obtained there must be a deposit for the bottle in addition to the price of the milk. After the bottle is emptied it may be returned and upon its insertion in the machine the amount of the deposit will be refunded. This is accomplished by bottle return mechanism having an opening 80 in the cabinet 10, such opening being covered by a sliding door panel 81. A handle 82 may be disposed on the exterior thereof by which the door panel 81 may be slid laterally on upper and lower guides or tracks 83 and 84, respectively to bring the opening 85 into registration with the opening 80 in which position a bottle may be inserted in the machine.

In order to prevent access to the interior of the machine when the door is open, a housing 86 is secured to the back of the door, such housing being open at one side and the bottom and having an inner wall 87 placed in the door at a distance sufficient to allow for the insertion of the bottle. A ratchet or rack 88 has reduced portions 89 at each end and such rack is mounted on the upper edge of the door 81 for engagement by a pivoted pawl 90 mounted on the upper track 83 in a position to be engaged by the ratchet 88 to allow the door to be fully opened. The pawl is adapted to drop into one of the reduced portions 89 before the door can be returned to a starting position.

The pawl 90 normally is biased in an upward direction by a spring 91 having one end located in an opening 92 in the top of the pawl and its opposite end attached to a bracket 93 on the inner surface of the facade or false front 41. A return spring 94 has one end connected to the door 81 by a bracket 95 and its opposite end attached by bracket 96 to the facade 41 to aid in returning the door to its initial position.

A door latch mechanism is provided so that the door may not be opened during the operation of the bottle return mechanism and such door latch mechanism comprises a solenoid 97 having a core 98, the outer end of which is pivotally attached to one end of a lever 99. When the core 98 of the solenoid 97 is retracted, it causes the lever 99 to be swung on its pivot 100 so that a notch 101 will engage a pin 102 and lock the parts in fixed relation. Upon the insertion of a bottle such as the bottle 17 through the openings 80 and 85 into a substantially U-shaped carriage 103, the switches 104 are depressed and upon being closed the door 81 will engage and depress the switch 105. When the switches 104 and 105 are thus depressed or actuated the motor 106 will be caused to operate and drive a sprocket 107 which in turn drives a chain 108 extending around a sprocket 109 mounted on a bracket 110, a link 111 being pivoted to a depending lock 112 attached to a slide 113 on which is mounted a carriage 103. This will cause the slide 113 to move along a pair of rail-forming bolts and nuts 114, the adjacent ends of which are supported in brackets 115 and the remote ends of which extend through the wall of the cabinet 10.

The carriage 103 when moved by the chain 108 will engage the carriage stop switch 116 and cause the carriage to allow a bottle to be checked for its acceptability. In order to determine whether the bottle is acceptable, it is checked for any desired characteristics such as both height and an identification key. An inverted U-shaped frame or yoke member 117 is disposed to receive the bottle within the same and in the upper portion of the yoke is a height gauge 118 carried on a mounting bar 119 slidably mounted in an opening 120 in the U-shaped frame member 117, said bar extending through a core 121 of the solenoid and with the upper end of the bar attached to an elevating spring 122, the upper end of which is attached to the overhanging portion of a bracket 123 so that when the solenoid is without energy, the gauge 118 is in its elevated position. When the solenoid is energized, the bar 119 will move downwardly and close a switch 124, whereupon the key solenoid 125 will be energized and the key 126 will be caused to move upwardly. If the bottle has an identification key recess complementary to that of the key 126 simultaneous with the energization of the height gauge 118, a reject solenoid 127 will be operated to cause the reject gate 128 to swing downwardly on the pivot 129 to move to a depending position and obstruct the removal of the bottle. The reject gate will then return to its original position. If the bottle is not accepted, the reject gate will remain in the depending position and the motor of the carriage will be energized again and carried forward and the next bottle will be tipped forwardly from the carriage so that it will pass mouth down, compress a collapsible bar 130 and slide down a reject chute 131 to the reject opening 132 and a slide panel with a handle 133, as shown in FIG. 1. If the bottle is accepted by the bottle height gauge and the solenoid operated identification key, the reject gate will be retracted to its upper position and the carriage motor energized to move the carriage forward. The cable 29 will move up over the pulley 71 and lift the bottle off the carriage and move the same through the doors 72 and into the cabinet 10. The carriage motor will continue to operate and return the carriage to its starting position whereupon the door latch solenoid 97 will be de-energized and the door released ready for the next operation.

It will be apparent from the foregoing that an insulated container is provided in which commodities can be maintained at a prescribed temperature and of course where the dispensing involves moisture releasing and absorbing characteristics, moisture control equipment can be added.

The chamber in which the objects to be refrigerated are contained is readily accessible from its exterior for supplying full containers and for removing empty containers on the one conveyor. The dispensing and refund mechanisms are combined so that they cooperate through the same electrical system in the mechanism by which they are conveyed. Further, the mechanism is relatively simple and easy to produce while relatively inexpensive and require minimum maintenance and repair. Further, the device does not require a constant attendant but will not dispense without receiving proper compensation for the articles dispensed and it is so constructed that there will be minimum breakage of bottles and loss of the contents thereof.

In the operation of the bottle return mechanism a 110 v. electrical circuit is provided for the operation of the carriage drive motor 106, a motor 140 which operates a timer index disk 141 having a plurality of contacts thereon for the sequential operation of the various components and a transformer 142 which converts the 110 v. power to 50 v. power used by most of the components.

The placing of a bottle 17 on the conveyor 103 closes the switches 104 which are connected in series with the door switch 105 and upon the closing of the door the circuit will be completed to a start relay 143. Such relay closes a switch 144 which energizes the carriage drive motor 106, a switch 145 which energizes the conveyor motor 60 and a switch 146 which completes a circuit through a switch 147 which along with switch 148 is mounted on the bracket 104'. The switch 147 is normally held open by the carriage and is closed by the moving away of the carriage 103 from the bracket 104' in order to maintain a complete circuit when the switches 104 are opened by the moving away of such carriage.

The switch 148 also is normally held open by the carriage and is closed by the moving away of such carriage. When switch 148 closes it completes a circuit to a hold relay 149 which in turn closes a pair of switches 150 and 151. Switch 150 energizes the door clamp solenoid 97 to lock the door during the operation of the bottle return mechanism and switch 151 closes one side of a circuit for a key relay 152, a reject relay 153 and a safety relay 154.

The carriage will move along the rails 114 until such time as it reaches the inverted U-shaped frame 117 and engages switch 116 having a pair of contacts 155 and 156. Contact 155 is normally closed and is interposed in the circuit to the start relay and when the carriage engages switch 116 contact 155 will be opened to de-energize the start relay and stop the carriage drive motor. Contact 156 will be closed to complete a circuit through a normally closed switch 157 on the reject relay 153 and a normally closed switch 158 on the key relay to a timer solenoid 159. Solenoid 159 closes a switch 160 to energize the timer motor 140 and rotate on arm 161 on the timer index disk 141. A cam on the timer motor shaft maintains the switch 160 closed until the timer index disk 141 completes one cycle. As the arm 161 rotates, it first engages a contact point 162 and completes a circuit to the reject relay 153 causing such relay to close and open switch 157 to break the circuit to the timer solenoid 159. Switch 163 is closed by the reject relay 153 and completes a holding circuit through a normally closed switch 164 on the key relay 152 so that the reject relay will remain in operative condition after arm 161 passes over contact point 162. Switch 165 is closed by the reject relay 153 and completes one side of a circuit to a switch 166 on the key solenoid 125. Switch 167 also is closed by such reject relay to by-pass the contact 155 and energize the start relay if the reject relay remains closed. In addition, switch 168 is closed by the reject relay to energize the reject solenoid 127 and move the reject gate 128 into the path of movement of the containers.

The arm 161 next engages a contact point 169 and completes a circuit to the container clamp solenoid 121 and causes bars 119 to be depressed to test the acceptability of the height of the container. If the container is of an acceptable height, switch 170 will be closed and will energize the key solenoid 125 to raise the key 126 and test the container for a cooperating key slot 18. If the container has a key slot 18 corresponding to the key 126, the key solenoid will close the switch 166 and complete a circuit to energize the key relay 152 through a normally closed switch 171. Closing the key relay 152 will signal acceptability of the container and will open the switch 164 and break the circuit to the reject relay 153 and return the reject solenoid 127 and the reject gate 128 to their inoperative positions to permit the container to pass into the machine.

In the event the container on the carriage is too tall, the switch 170 cannot be closed hence the key solenoid 125 will not be energized and the circuit to the key relay will not be completed to break the circuit to the reject solenoid and the container will be rejected from the machine because the carriage will move forward and the reject gate 128 will not permit the container to move so that the carriage will move from beneath the rejected container and such container will fall by gravity and be rejected through the chute 131.

If the container is too short, the container clamp solenoid will be depressed too far and will open the switch 171 and the key relay 152 cannot be energized.

Likewise if the key solenoid 125 is energized and the key 126 cannot enter a corresponding slot, the switch 166 will not be closed, the circuit to the key relay cannot be completed and the container will be rejected.

When the key relay 152 is energized, the switch 164 will be opened to interrupt the holding circuit to the reject relay and de-energize such reject relay. Simultaneously a switch 173 will be closed by the key relay to complete a holding circuit through a normally closed switch 174 on the safely relay 154 to maintain the key relay in operative position when the container clamp solenoid and the key solenoid are returned to their inoperative positions. A switch 175 also will be closed by such key relay to complete a circuit to the 110 v. line to operate a pair of solenoids 176 and 177 which return the refund for an acceptable container. A switch 178 is likewise closed by the key relay and such switch is interposed in the circuit of the start relay to by-pass contacts 155 and operate such start relay.

When the safety relay is energized by the key being raised too far, the switch 174 will be opened and the circuit to the key relay will be interrupted and such key relay will be opened. A switch 179 will be closed to complete a holding circuit for the safety relay until the operation of the container return mechanism is completed. A switch 180 also is closed by the safety relay to again complete a circuit to the reject relay 153 and reject the container.

The arm 161 next will close a contact 181 to energize the start relay to move the carriage forward so that an accepted container may be removed from the carriage by the conveyor 29 and taken into the cabinet 10 and the carriage returned to its starting position.

Continued rotation of the arm 161 will complete circuits through contacts 182, 183, 184 and 185 sequentially to operate solenoids 176 and 177 when a container has been accepted and the key relay remains closed.

In order to modify the temperature within the cabinet 10 to prevent spoilage of the contents of the containers, the cabinet 10 is provided with a refrigeration unit comprising a compressor 190 connected to a condenser 191 and an evaporator 192 by service lines 193. The flow of the refrigerant is controlled by a cut-off valve 194 and may if desired be under the influence of a thermostat to keep a constant temperature within the cabinet 10 regardless of the atmospheric temperature.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for the refrigeration and dispensing of matter in containers and for the refund of a deposit when the container is returned comprising a cabinet for filled containers to be dispensed and for receiving empty containers, said cabinet having a supporting surface therein, guide means providing a serpentine path for the containers, a conveyor disposed centrally on said surface between said guide means and on which conveyor said containers are adapted to rest and be advanced, an electric circuit including means for removing containers one by one from said conveyor, mechanism including a coin slot for receiving coins in payment for a container with its contents, an electric switch actuatable by coins introduced for energizing said circuit and causing the conveyor to move and a container to be advanced, a dispenser adapted to be actuated to place the container in position to be removed from the machine, said cabinet having an opening for receiving an empty container, a carriage operable by said empty container and movable horizontally in a compartment behind said opening, means for checking the characteristics of the returned container to determine its acceptability, said means including a height gauge and an identification key in the longitudinal axis of the container, said key being of a configuration to fit into a complementary recess in said container, a gate movable into the path of movement of the containers for ejecting a container not having the proper characteristics, means for transferring the container from the carriage to the conveyor, and means for moving said conveyor to carry said container thereonto between said guides.

2. Apparatus for the dispensing of filled containers having physical characteristics which differentiate such containers from similar containers and for the issuance of a refund upon the return of the empty containers comprising a cabinet having an opening for the discharge of filled containers and a second opening for the receipt of empty containers, guide means defining a path for said containers, conveyor means for advancing said filled containers along said path to a place of discharge and for receiving empty containers, coin operated means for controlling the dispensing of said containers one at a time, means operable by the returned container for checking the characteristics thereof to determine its acceptability, means for rejecting unacceptable containers, means for transferring accepted containers to said conveyor and for advancing said conveyor, and means for issuing a refund for each container accepted.

3. In apparatus for the refrigerating and coin control dispensing of containers of material and the issuing of a refund for empty containers having specific characteristics, a cabinet having an opening through which filled containers can be dispensed, coin-controlled means for dispensing said filled containers, a second opening in said cabinet through which empty containers can be received, means for moving the returned empty containers to a position to be checked, means for checking the specific characteristics of such containers and rejecting or accepting the same, means for moving the accepted containers to a storage area and means for expelling the rejected containers from the cabinet.

4. Refund issuing apparatus comprising a cabinet having an opening through which articles having specific characteristics are adapted to be received and on which a refund is to be made, means whereby said articles may be disposed in a checking position, means for checking the specific characteristics of the articles, means for rejecting or accepting the articles according to such characteristics, and means for expelling the rejected containers from the cabinet and for moving the accepted articles to a storage area within the cabinet.

5. Refund issuing apparatus for containers having specific characteristics and on which a refund is to be made comprising a cabinet having an opening through which said containers are placed, a carriage within said cabinet adapted to receive said containers, electrical means operable by said containers for moving the carriage to a position to check said container, multiple mechanisms operable by said container for checking the characteristics of the container to determine the acceptability thereof, a gate controlled by said mechanisms for rejecting or accepting said containers, means operable by said mechanisms for advancing the carriage and moving the accepted containers to a storage area within the container, means operable by said mechanisms for issuing a refund for an accepted container, and means for returning said carriage to its initial position, and means for expelling the rejected containers.

6. Coin-operated apparatus for the dispensing of material in reusable containers and for the issuance of a refund when the containers are returned, comprising a cabinet including insulated walls in which filled and empty containers are adapted to be held, means for modifying temperature within said cabinet, a support for the material within said cabinet, guide means defining a serpentine path on said support, conveyor means resting on said support and extending along said serpentine path between said guide means and on which said containers are adapted to rest and be carried along by said conveyor means and beneath which containers said conveyor means can slide when the movement of said containers is obstructed, electrical means for moving said conveyor means, coin-controlled means for dispensing a filled container, means for receiving an empty container, identification means for checking the specific characteristics of said empty containers, means for ejecting containers not having the proper characteristics, and means for advancing acceptable containers into said cabinet and issuing a refund therefor.

7. Coin-operated apparatus for holding and dispensing bottled material and for receiving empty bottles and issuing a refund therefor, said apparatus comprising a cabinet having insulated walls defining a chamber for filled and empty bottles, a floor in said chamber, guide means on said floor defining a serpentine path along which filled and empty bottles are adapted to be disposed, a conveyor cable along said path on which said bottles are adapted to rest and which can slide beneath said bottles when the movement of said bottles is obstructed, means for moving said cable, means for receiving an empty bottle and checking said bottle for specific characteristics, means for transferring a bottle with the specific characteristics onto said conveyor, and means for ejecting a bottle which lacks certain physical characteristics.

8. Apparatus for the coin controlled dispensing of filled containers and for issuing a refund for empty containers comprising a cabinet having a first opening through which filled containers are discharged and a second opening through which empty containers are received, guide means defining a path for said containers substantially from the second opening in said cabinet to the first opening in said cabinet, conveyor means along said path for supporting said containers, said conveyor means being adapted to advance said containers and being capable of moving when the advancement of said containers is obstructed, coin controlled means for operating said conveyor means and for dispensing filled containers through said first opening one at a time, container controlled means for operating said conveyor means for each container returned, and means for issuing a refund for each container returned.

9. Apparatus for the coin controlled dispensing of filled containers and for issuing a refund for empty containers comprising a cabinet having a first opening through which filled containers are dispensed and a second opening through which empty containers are received, conveyor means for said containers extending substantially from the second opening in said cabinet to the first opening in said cabinet, said conveyor means being adapted to support and advance said containers and being capable of sliding beneath said containers when the advancement thereof is obstructed, coin controlled means for operating said conveyor means and for dispensing filled containers one at a time through said first opening, container controlled means for operating said conveyor means for each container returned, mechanisms operable by said container for determining the acceptability thereof, a gate controlled by said mechanisms for ejecting unacceptable containers, and means operable by said mechanisms for issuing a refund for each container returned.

References Cited in the file of this patent

UNITED STATES PATENTS

| | | |
|---|---|---|
| 1,411,169 | Ehrman | Mar. 28, 1922 |
| 1,438,112 | Hendricks | Dec. 5, 1922 |
| 1,446,010 | Holland | Feb. 20, 1923 |
| 1,482,197 | Kimball | Jan. 29, 1924 |
| 1,901,528 | Olsen | Mar. 14, 1933 |
| 2,280,323 | Tone | Apr. 21, 1942 |
| 2,368,796 | Ardell | Feb. 6, 1945 |
| 2,393,246 | Hallowell | Jan. 22, 1946 |
| 2,462,021 | Harker | Feb. 15, 1949 |
| 2,804,958 | Garrard | Sept. 3, 1957 |

FOREIGN PATENTS

| | | |
|---|---|---|
| 791,049 | Great Britain | Feb. 19, 1958 |